United States Patent
Yamamoto et al.

(10) Patent No.: US 12,541,864 B2
(45) Date of Patent: Feb. 3, 2026

(54) OBJECT TRACKING DEVICE AND OBJECT TRACKING METHOD

(71) Applicant: KYOCERA Corporation, Kyoto (JP)

(72) Inventors: Kenji Yamamoto, Yokohama (JP); Jun Kuroda, Kodaira (JP); Tooru Sahara, Yokohama (JP); Fangwei Tong, Machida (JP); Takuya Homma, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 300 days.

(21) Appl. No.: 18/250,420

(22) PCT Filed: Sep. 15, 2021

(86) PCT No.: PCT/JP2021/033989
§ 371 (c)(1),
(2) Date: Apr. 25, 2023

(87) PCT Pub. No.: WO2022/091620
PCT Pub. Date: May 5, 2022

(65) Prior Publication Data
US 2023/0368402 A1 Nov. 16, 2023

(30) Foreign Application Priority Data
Oct. 28, 2020 (JP) .................. 2020-180822

(51) Int. Cl.
*G06T 7/277* (2017.01)
*G06T 7/246* (2017.01)

(52) U.S. Cl.
CPC ............. *G06T 7/277* (2017.01); *G06T 7/248* (2017.01); *G06T 2207/10016* (2013.01); *G06T 2207/20076* (2013.01); *G06T 2207/30252* (2013.01)

(58) Field of Classification Search
CPC ................... G06T 7/277; G06T 7/248; G06T 2207/10016; G06T 2207/20076;
(Continued)

(56) References Cited

U.S. PATENT DOCUMENTS 8,055,020 B2   11/2011   Meuter et al.
10,282,622 B2   5/2019   Togashi et al.
(Continued)

FOREIGN PATENT DOCUMENTS

CN   110555377 A   12/2019
JP   H11-321494 A   11/1999
(Continued)

OTHER PUBLICATIONS

Kim et al., "Data fusion of radar and image measurements for multi-object tracking via Kalman filtering", Elsevier, 2014.*

*Primary Examiner* — Aaron W Carter
(74) *Attorney, Agent, or Firm* — Studebaker Brackett PLLC

(57) ABSTRACT

Provided are an object tracking device and an object tracking method that allow multiple objects to be tracked with high accuracy. An object tracking device (20) includes an input interface (21), a processor (23), and an output interface (24). The input interface (21) is configured to acquire sensor data. The processor (23) is configured to detect multiple detection targets from the sensor data and perform tracking using a Kalman filter for each of the multiple detection targets. The output interface (24) is configured to output detection results of the detection targets. The processor (23) groups a plurality of the Kalman filters and determines whether or not each of the Kalman filters corresponds to an identical object.

10 Claims, 14 Drawing Sheets

(58) Field of Classification Search
CPC . G06T 2207/30252; G06T 2207/20084; G06T 2207/30196; G06T 2207/30232; H04N 7/183
See application file for complete search history.

(56) References Cited

U.S. PATENT DOCUMENTS

| | | | | |
|---|---|---|---|---|
| 2003/0095140 | A1* | 5/2003 | Keaton | G06F 3/042 715/700 |
| 2004/0072582 | A1* | 4/2004 | Aljadeff | H04W 64/00 455/456.1 |
| 2006/0109905 | A1* | 5/2006 | Seok | H04N 19/523 375/E7.157 |
| 2008/0118106 | A1* | 5/2008 | Kilambi | G06M 11/00 382/103 |
| 2012/0148094 | A1* | 6/2012 | Huang | G08G 1/054 382/103 |
| 2012/0165084 | A1* | 6/2012 | Sung | A63F 13/837 463/7 |
| 2017/0011520 | A1* | 1/2017 | Mathew | G06F 18/23 |
| 2018/0225396 | A1* | 8/2018 | Lee | G06F 17/16 |
| 2019/0065859 | A1* | 2/2019 | Togashi | G06T 7/215 |
| 2019/0212412 | A1* | 7/2019 | Paluszek | G01S 13/726 |
| 2020/0355782 | A1* | 11/2020 | Paluszek | G01S 13/726 |
| 2022/0283289 | A1* | 9/2022 | Healey | G01S 13/726 |
| 2023/0046397 | A1* | 2/2023 | Yamamoto | G06T 7/62 |
| 2023/0048222 | A1* | 2/2023 | Yamamoto | G06V 10/56 |
| 2023/0119634 | A1* | 4/2023 | Kabkab | G06F 18/2431 382/103 |
| 2023/0368402 | A1* | 11/2023 | Yamamoto | G06T 7/248 |
| 2023/0394682 | A1* | 12/2023 | Yamamoto | G06V 20/58 |
| 2024/0144491 | A1* | 5/2024 | Yamamoto | G06T 7/277 |
| 2024/0212172 | A1* | 6/2024 | Yamamoto | G06T 7/277 |
| 2025/0078450 | A1* | 3/2025 | Zhong | G06V 10/82 |

FOREIGN PATENT DOCUMENTS

| | | |
|---|---|---|
| JP | 2000-348181 A | 12/2000 |
| JP | 2009-089365 A | 4/2009 |
| WO | 2018/105112 A1 | 6/2018 |

* cited by examiner

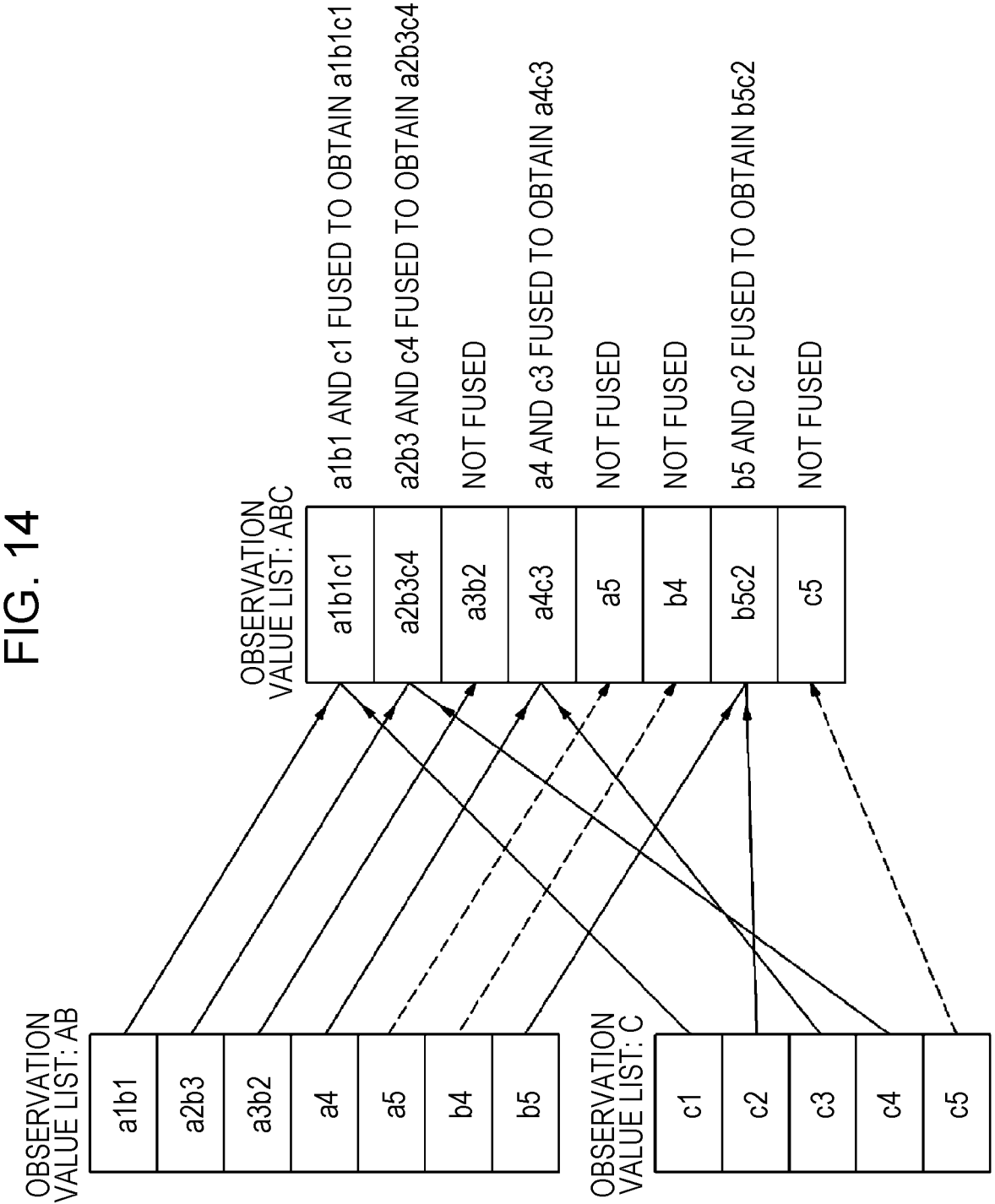

OBJECT TRACKING DEVICE AND OBJECT TRACKING METHOD

CROSS-REFERENCE TO RELATED APPLICATIONS

This application claims priority of Japanese Patent Application No. 2020-180822 (filed Oct. 28, 2020), the entire disclosure of which is hereby incorporated by reference.

TECHNICAL FIELD

The present disclosure relates to an object tracking device and an object tracking method.

BACKGROUND OF INVENTION

Technologies for detecting surrounding objects, tracking the detected objects, and predicting the movement of the detected objects are known. For example, Patent Literature 1 discloses a device that processes video signals output from a vehicle-mounted camera that captures an image of the surroundings of the vehicle, detects the presence of approaching vehicles and pedestrians, and displays the captured image with square frame marks added to the approaching vehicles and pedestrians.

CITATION LIST

Patent Literature

Patent Literature 1: Japanese Unexamined Patent Application Publication No. 11-321494

SUMMARY

In an embodiment, an object tracking device includes an input interface, a processor, and an output interface. The input interface is configured to acquire sensor data. The processor is configured to detect multiple detection targets from the sensor data and perform tracking using a Kalman filter for each of the multiple detection targets. The output interface is configured to output detection results of the detection targets. The processor groups a plurality of the Kalman filters and determines whether or not each of the Kalman filters corresponds to an identical object.

In an embodiment, an object tracking method includes acquiring sensor data, detecting multiple detection targets from the sensor data and tracking each of the multiple detection targets using a Kalman filter, and outputting detection results of the detection targets. The tracking includes grouping a plurality of the Kalman filters and determining whether or not each of the Kalman filters corresponds to an identical object.

In an embodiment, an object tracking device includes an input interface and a processor. The input interface is configured to acquire multiple sensor data obtained using different sensing methods. The processor is configured to detect multiple detection targets from the multiple sensor data and perform data processing for tracking each of the multiple detection targets using a Kalman filter. The processor groups a plurality of the Kalman filters and determines whether or not each of the Kalman filters corresponds to an identical object.

In an embodiment, an object tracking method includes: acquiring multiple sensor data obtained using different sensing methods; and detecting multiple detection targets from the multiple sensor data and performing data processing for tracking each of the multiple detection targets using a Kalman filter. The tracking includes grouping a plurality of the Kalman filters and determining whether or not each of the Kalman filters corresponds to an identical object.

BRIEF DESCRIPTION OF THE DRAWINGS

FIG. 14 is a diagram for explaining overlapping use of fusion.

DESCRIPTION OF EMBODIMENTS

Figure 1:
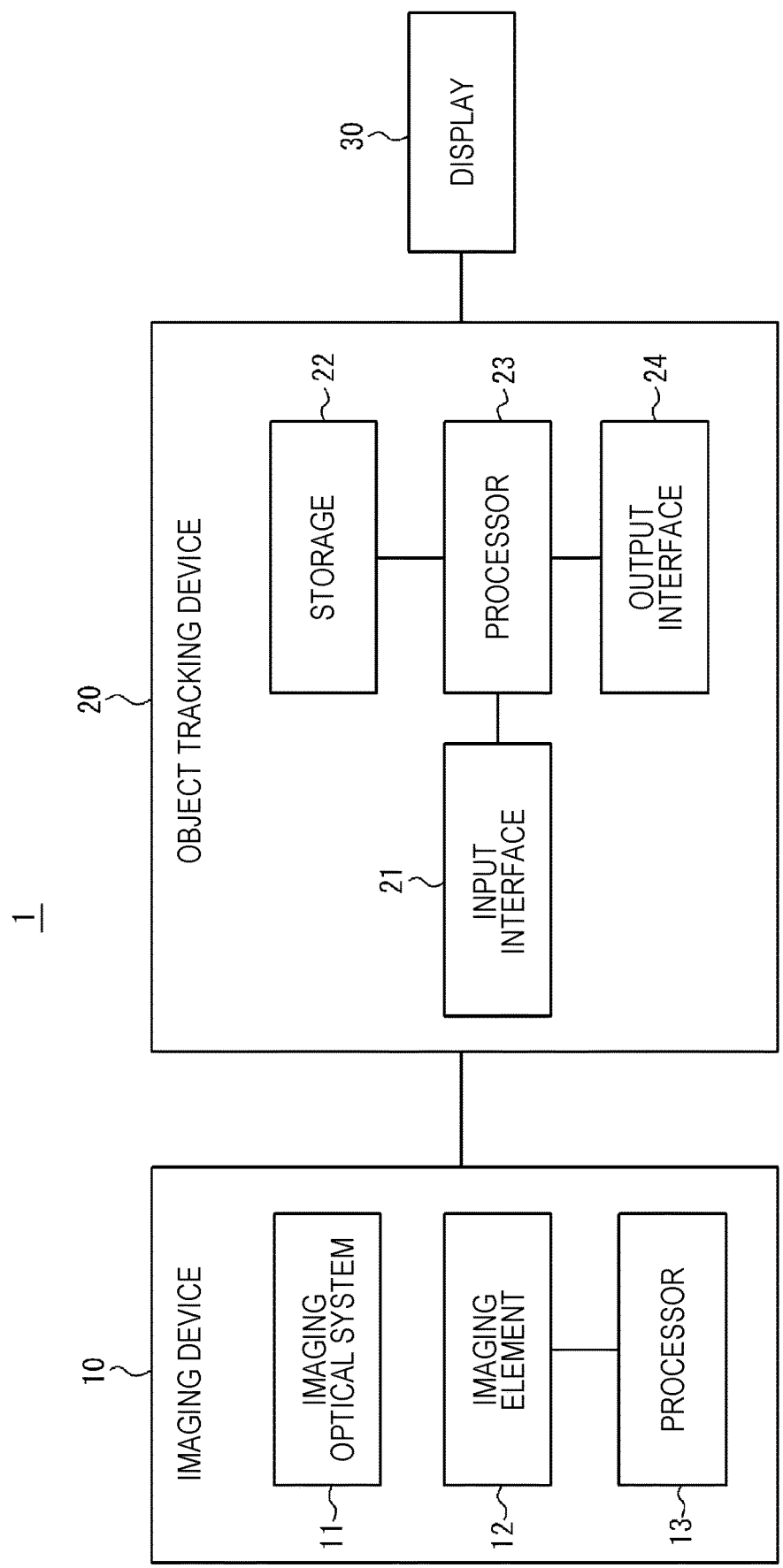
FIG. 1 is a block diagram illustrating the schematic configuration of an object tracking system including an object tracking device according to an embodiment.

Hereafter, an embodiment of the present disclosure will be described while referring to the drawings. The drawings used in the following description are schematic drawings. The dimensional proportions and so on in the drawings do not necessarily match the actual dimensional proportions and so on.

FIG. 1 is a block diagram illustrating the schematic configuration of an object tracking system 1. An object tracking device 20 according to an embodiment of the present disclosure is included in the object tracking system 1. In this embodiment, the object tracking system 1 includes an imaging device 10, the object tracking device 20, and a display 30. The object tracking system 1 is mounted on or in a vehicle 100. The vehicle 100 is an example of a mobile object as illustrated in FIG. 2.

The object tracking device 20 according to this embodiment acquires video images from the imaging device 10 as sensor data. In other words, in this embodiment, a sensor that is used to detect multiple detection targets is an imaging element 12. The imaging element 12 is included in the imaging device 10 and captures visible light. However, the object tracking system 1 is not limited to the configuration illustrated in FIG. 1. The object tracking system 1 may include a different device from the imaging device 10 so long as that device is capable of detecting multiple detection targets. As another example, the object tracking system 1 may include, instead of the imaging device 10, a measurement device that measures the distance to a detection target from the reflected waves of radiated laser light. As another example, the object tracking system 1 may include a detection device including a millimeter wave sensor instead of the imaging device 10. As another example, the object tracking system 1 may include an imaging device 10 including an imaging element 12 that captures light outside the visible light range. The object tracking system 1 may include at least one out of the following: an imaging device 10 for visible light, a measurement device that measures the distance to a detection target from reflected waves of radiated laser light, a detection device including a millimeter wave sensor, and an imaging device 10 for non-visible light.

In this embodiment, the object tracking system 1 is mounted on or in a mobile object and detects objects 40 (refer to FIG. 2) in the surroundings of the moving mobile object. However, the object tracking system 1 does not need to be mounted on or in a mobile object. As another example, the object tracking system 1 may be used in a facility such as a factory in order to detect employees, transportation robots, manufactured goods, and so on. As another example, the object tracking system 1 may be used in a senior citizen care facility in order to detect elderly people and staff inside rooms. The object tracking system 1 may track objects not only to improve the safety of driving or operation, but also, for example, to improve work efficiency, quality control, or productivity in agricultural and industrial environments. Here, in the present disclosure, objects to be detected by the object tracking device 20 include not only objects such as mobile objects but also people.

Figure 2:
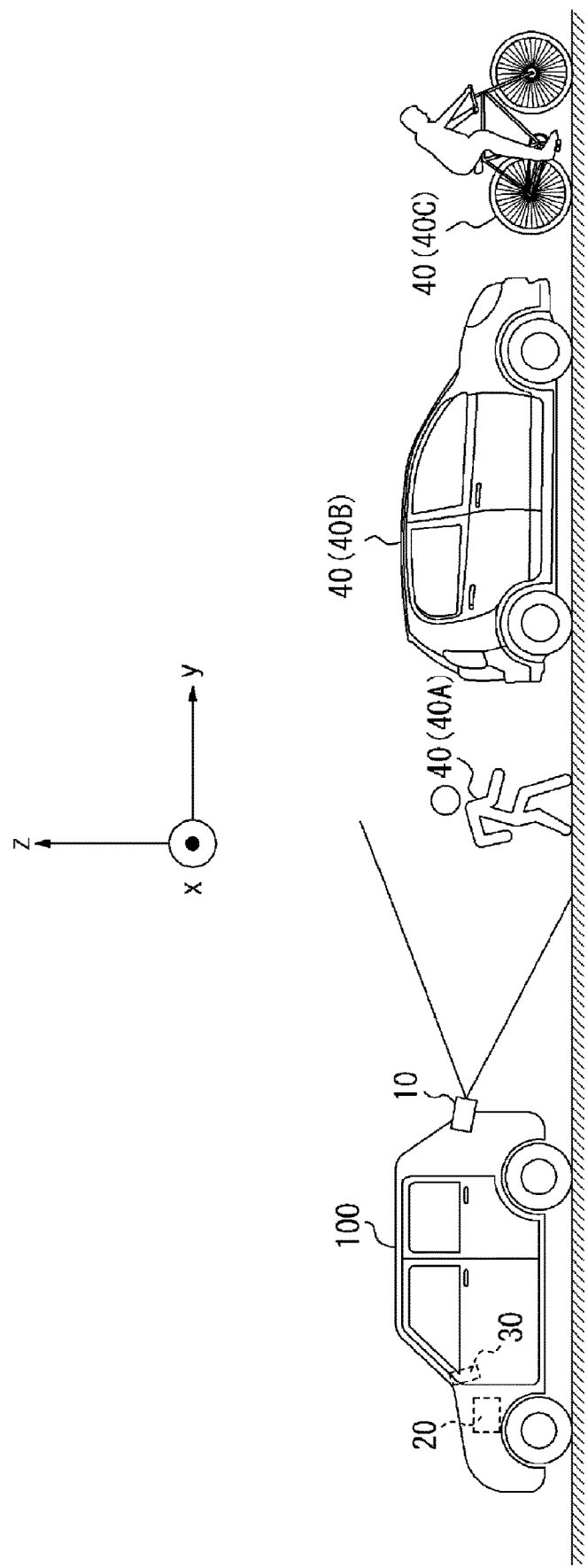
FIG. 2 is a diagram illustrating a vehicle equipped with the object tracking system of FIG. 1 and detection targets.

As illustrated in FIG. 2, in this embodiment, the x-axis direction of real space coordinates is the width direction of the vehicle 100 in which the imaging device 10 is installed. The y-axis direction is the direction in which the vehicle 100 reverses. The x-axis direction and the y-axis direction are parallel to the road surface on which the vehicle 100 is located. The z-axis direction is perpendicular to the road surface. The z-axis direction may be referred to as a vertical direction. The x-axis direction, the y-axis direction, and the z-axis direction are perpendicular to each other. The x-axis direction, the y-axis direction, and the z-axis direction do not need to be defined in this way. The x-axis direction, the y-axis direction, and z-axis direction may be swapped with each other.

The imaging device 10 includes an imaging optical system 11, the imaging element 12, and a processor 13.

The imaging device 10 can be installed at various positions on or in the vehicle 100. The imaging device 10 includes, but is not limited to, a front camera, a left side camera, a right side camera, and a rear camera. A front camera, a left side camera, a right side camera, and a rear camera are installed on or in the vehicle 100 so as to respectively allow imaging of the surrounding regions to the front, the left side, the right side and the rear of the vehicle 100. In the embodiment described as one example below, as illustrated in FIG. 2, the imaging device 10 is mounted on the vehicle 100 with the optical axis direction pointing downward from the horizontal direction so that the region to the rear of the vehicle 100 can be imaged.

The imaging optical system 11 may include one or more lenses. The imaging element 12 may include a charge-coupled device (CCD) image sensor or a complementary MOS (CMOS) image sensor.

The imaging element 12 converts an object image (subject image) formed on an imaging surface of the imaging element 12 by the imaging optical system 11 into an electrical signal. The imaging element 12 is capable of capturing video images at a prescribed frame rate. A "frame" refers to each still image constituting a video image. The number of images that can be captured per second is called the frame rate. The frame rate may be 60 frames per second (fps), for example, or 30 fps.

The processor 13 controls the entire imaging device 10 and performs various image processing operations on the video image output from imaging element 12. The image processing performed by the processor 13 may include any suitable processing such as distortion correction, brightness adjustment, contrast adjustment, gamma correction, and so on.

The processor 13 may include one or more processors. The processor 13 includes one or more circuits or units configured to perform one or more data calculation procedures or processing operations, for example, by executing instructions stored in an associated memory. The processor 13 consists of one or more processors, microprocessors, microcontrollers, application-specific integrated circuits (ASICs), digital signal processors (DSPs), programmable logic devices (PLDs), field programmable gate arrays (FPGAs), or any combination of these devices or configurations, or any combination of other known devices or configurations.

The object tracking device 20 includes an input interface 21, a storage 22, a processor 23, and an output interface 24.

The input interface 21 is configured to be able to communicate with the imaging device 10 via wired or wireless communication means. The input interface 21 acquires video images from the imaging device 10 as sensor data. The input interface 21 may support the transmission method of an image signal transmitted by the imaging device 10. The input interface 21 can be referred to as an input unit or an acquiring unit. The imaging device 10 and the input interface 21 may be connected to each other by an in-vehicle communication network such as a control area network (CAN).

The storage 22 is a storage device that stores data and programs necessary for the processing operations performed by the processor 23. For example, the storage 22 temporarily stores video images acquired by the imaging device 10. For example, the storage 22 stores data generated by the processing performed by the processor 23. The storage 22 may consist of one or more out of a semiconductor memory, a magnetic memory, and an optical memory, for example. Semiconductor memories may include volatile memories and nonvolatile memories. Magnetic memories may include, for example, hard disks and magnetic tapes. Optical memories may include, for example, compact discs (CDs), digital versatile discs (DVDs), and blu-ray (registered trademark) discs (BDs).

The processor 23 controls the entirety of the object tracking device 20. The processor 23 recognizes an object image contained in a video image acquired via the input interface 21. The processor 23 transforms and maps the coordinates of the recognized object image to the coordinates of an object 40 in a virtual space 46 (refer to FIG. 6) and tracks the position and the velocity of a mass point 45 (refer to FIG. 5) representing the object 40 in the virtual space 46. The mass point 45 is a point that has mass but no size. The virtual space 46 is a two-dimensional space having a prescribed fixed value in the z-axis direction in a coordinate system consisting of three axes, namely, the x-axis, the y-axis, and the z-axis, of real space. The processor 23 may transform and map the coordinates of the tracked mass point 45 in the virtual space 46 to coordinates in the video image.

The processor 23 also detects multiple detection targets from the video image and tracks each of the multiple detection targets using a Kalman filter. When multiple detection targets are detected, if the images of the detection targets overlap in the video image, tracking errors or a reduction in accuracy will occur when using techniques of the related art. In this embodiment, the processor 23 is able to avoid such problems by associating one or more Kalman filters with each of the multiple detection targets. The processor 23 also manages observation values, the Kalman filters, and unique identification information of tracked objects ("tracked objects ID") in respective layers (in a hierarchy). The processor 23 determines whether or not tracked objects are the same object and executes processing for associating the observation values, the Kalman filters, and the tracked object IDs with each other. In this way, the accuracy with which multiple detection targets are tracked can be further improved. The processing performed by the processor 23 is described in detail later. The processor 23 may include multiple processors, similarly to the processor 13 of the imaging device 10. Similarly to the processor 13, the processor 23 may consist of multiple types of devices used in combination with each other.

The output interface 24 is configured to output an output signal from the object tracking device 20. The output interface 24 may be referred to as an output unit. The output interface 24 may output the detection results of a detection target, such as the coordinates of the mass point 45.

The output interface 24 may include a physical connector and a wireless communication device. The output interface 24 may be connected to a network of the vehicle 100 such as a CAN. The output interface 24 may be connected to the display 30 and to a control device and an alarm device and so on of the vehicle 100 via a communication network such as a CAN. Information output from the output interface 24 may be used by the display 30, the control device, and the alarm device as appropriate.

The display 30 can display video images output from object tracking device 20. Upon receiving the coordinates of the mass point 45, which represent the position of the object image, from the object tracking device 20, the display 30 may have a function of generating an image element (for example, a warning to be displayed together with the approaching object) in accordance with the received coordinates and superimposing the image element on the video image. Any of various types of devices may be used as the display 30. For example, a liquid crystal display (LCD), an organic electroluminescence (EL) display, an inorganic EL display, a plasma display panel (PDP), an electric field emission display (FED), an electrophoretic display, a twisted ball display, and so on may be used as the display 30.

Next, an object tracking method performed by the object tracking device 20 will be described in detail while referring to the flowchart in FIG. 3. The object tracking device 20 may be configured to implement the processing performed by the processor 23 described below by reading a program recorded on a non-transitory computer-readable medium. Non-transitory computer readable media include, but are not limited to, magnetic storage media, optical storage media, magneto-optical storage media, and semiconductor storage media. Magnetic storage media include magnetic disks, hard disks, and magnetic tapes. Optical storage media include optical discs such as CDs, DVDs, and BDs. Semiconductor storage media include read only memories (ROMs), electrically erasable programmable read-only memories (EEPROMs), and flash memories.

Figure 3:
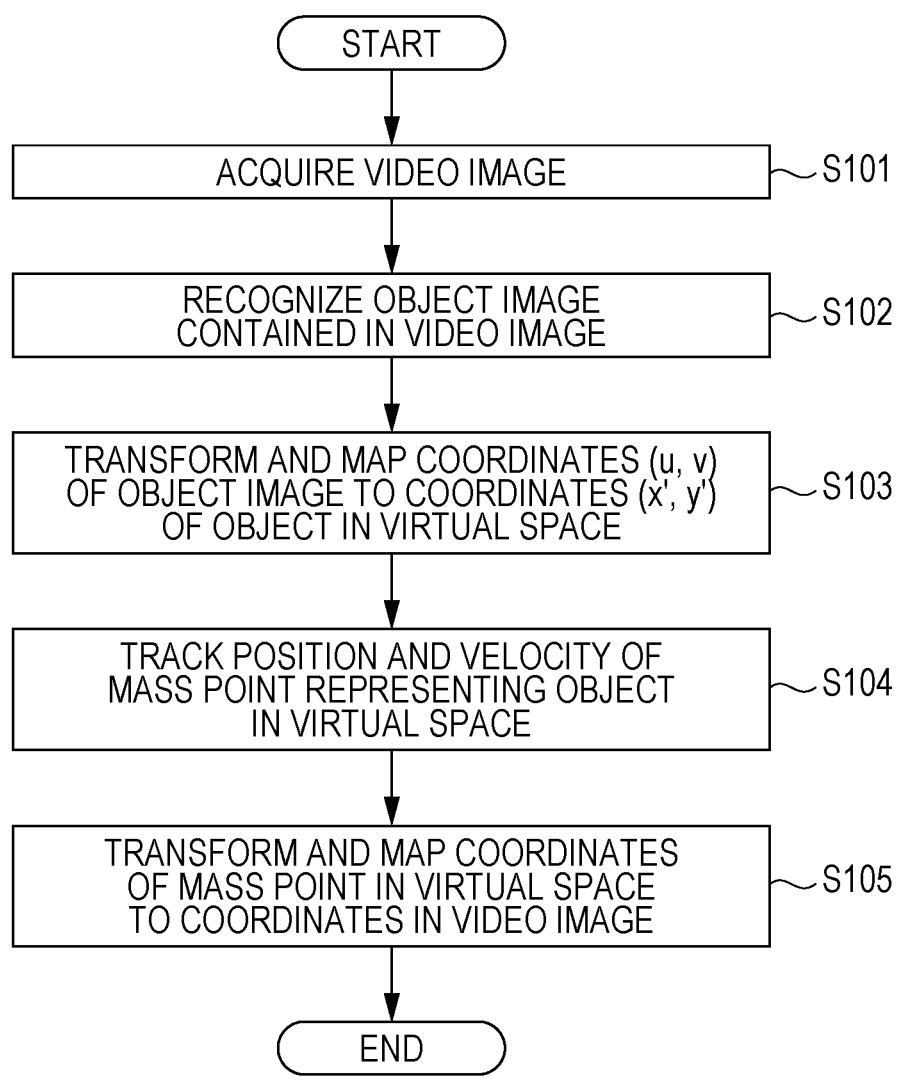
FIG. 3 is a flowchart illustrating an example of processing for tracking an object image in a video image.

The flowchart in FIG. 3 illustrates the processing performed by the processor 23 upon acquiring sequential frames of a video image. The processor 23 of the object tracking device 20 tracks the position of an object image 42 (see FIG. 4) each time a frame of the video image is acquired in accordance with the flowchart in FIG. 3. As illustrated in FIG. 2, there are multiple objects 40 as detection targets and the objects 40 may include a pedestrian 40A, a car 40B, and a bicycle 40C. Furthermore, the objects 40 are not limited to moving objects and people, and may include various objects such as obstacles on the road. In the following description of the object tracking method, only one of the multiple objects 40 (specifically, the pedestrian 40A) contained in the video image captured by the imaging device 10 installed at the rear of the vehicle 100 will be used. Each of the other objects 40 (for example, the car 40B and the bicycle 40C) would be tracked using similar processing.

Figure 4:
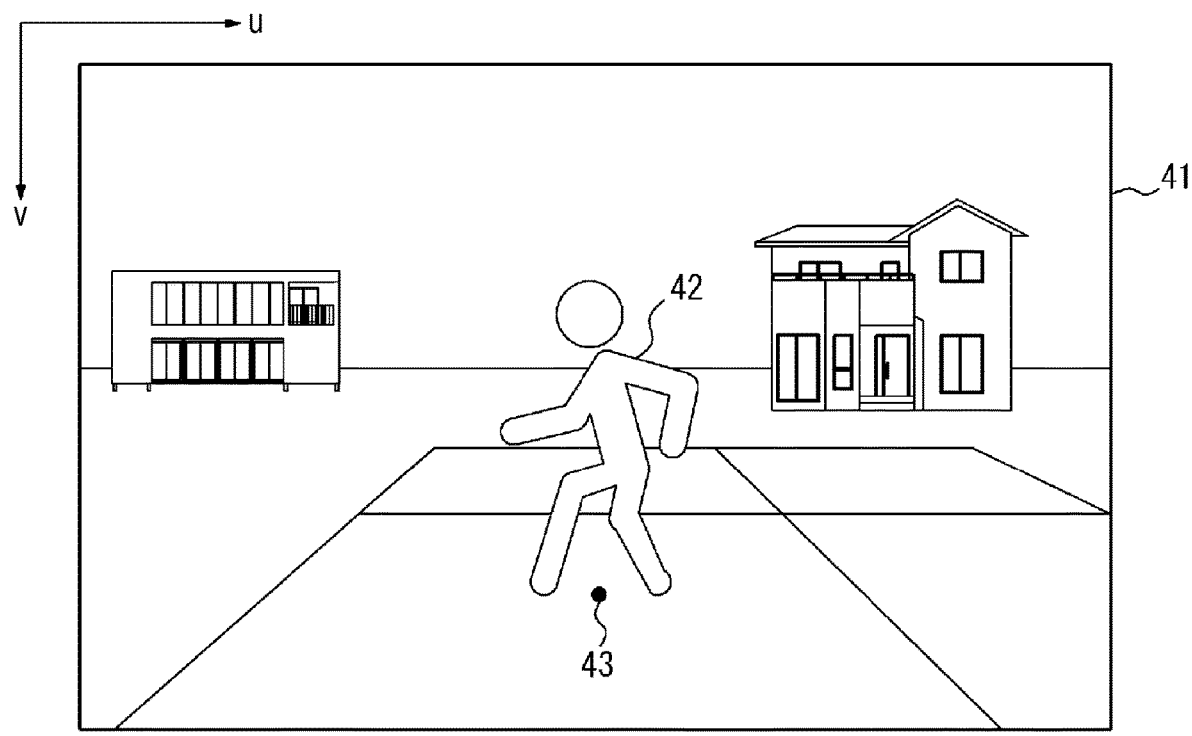
FIG. 4 illustrates an example of an object image in a video image.

The processor 23 acquires each frame of the video image from the imaging device 10 via the input interface 21 (Step S101). FIG. 4 illustrates an example of a single frame of the video image. In the example in FIG. 4, the image of an object 40 behind the vehicle 100 (object image 42) is displayed in a two-dimensional image space 41 composed of a uv coordinate system. The u coordinates are the coordinates in the horizontal direction of the image. The v coordinates are the coordinates in the vertical direction in the image. In FIG. 4, the origin of the uv coordinates is a point at the upper left corner of the image space 41. The positive direction of the u coordinates is the direction from left to right. The positive direction of the v coordinates is the direction from top to bottom.

The processor 23 recognizes the object image 42 from each frame of the video image using image recognition (Step S102). Examples of the method used to recognize the object image 42 include various known methods. For example, examples of the method used to recognize the object image 42 include methods based on shape recognition of objects such as cars and people, methods based on template matching, and methods in which features are calculated from the image and used to perform matching. A function approximator capable of learning input-output relationships can be used to calculate features. For example, neural networks can be used as a function approximator that can learn input-output relationships.

The processor 23 transforms and maps coordinates (u, v) of the object image 42 in the image space 41 to coordinates (x', y') of the object in the virtual space 46 (refer to FIG. 6) (Step S103). In general, coordinates (u, v) in the image space 41, which are two-dimensional coordinates, cannot be converted into coordinates (x, y, z) in real space. However, by specifying the height in real space and fixing the z-coordinate at a prescribed value, the coordinates (u, v) in the image space 41 can be mapped to the coordinates (x', y') in the two-dimensional virtual space 46 corresponding to coordinates (x, y, $z_0$) ($z_0$ is a fixed value) in the real space. Here, in this embodiment, the virtual space 46 is a two-dimensional space, but the virtual space 46 could be three-dimensional space depending on the input information (type of sensor).

As illustrated in FIG. 4, a representative point 43 is identified that is located at the bottom center of the object image 42. For example, the representative point 43 may be located at the lowest v-coordinate position and at the center of the u-coordinate range in the region occupied by the object image 42 in the image space 41. This representative point 43 is assumed to be at the position where the object 40 corresponding to object image 42 contacts the road surface or ground.

Figure 5:
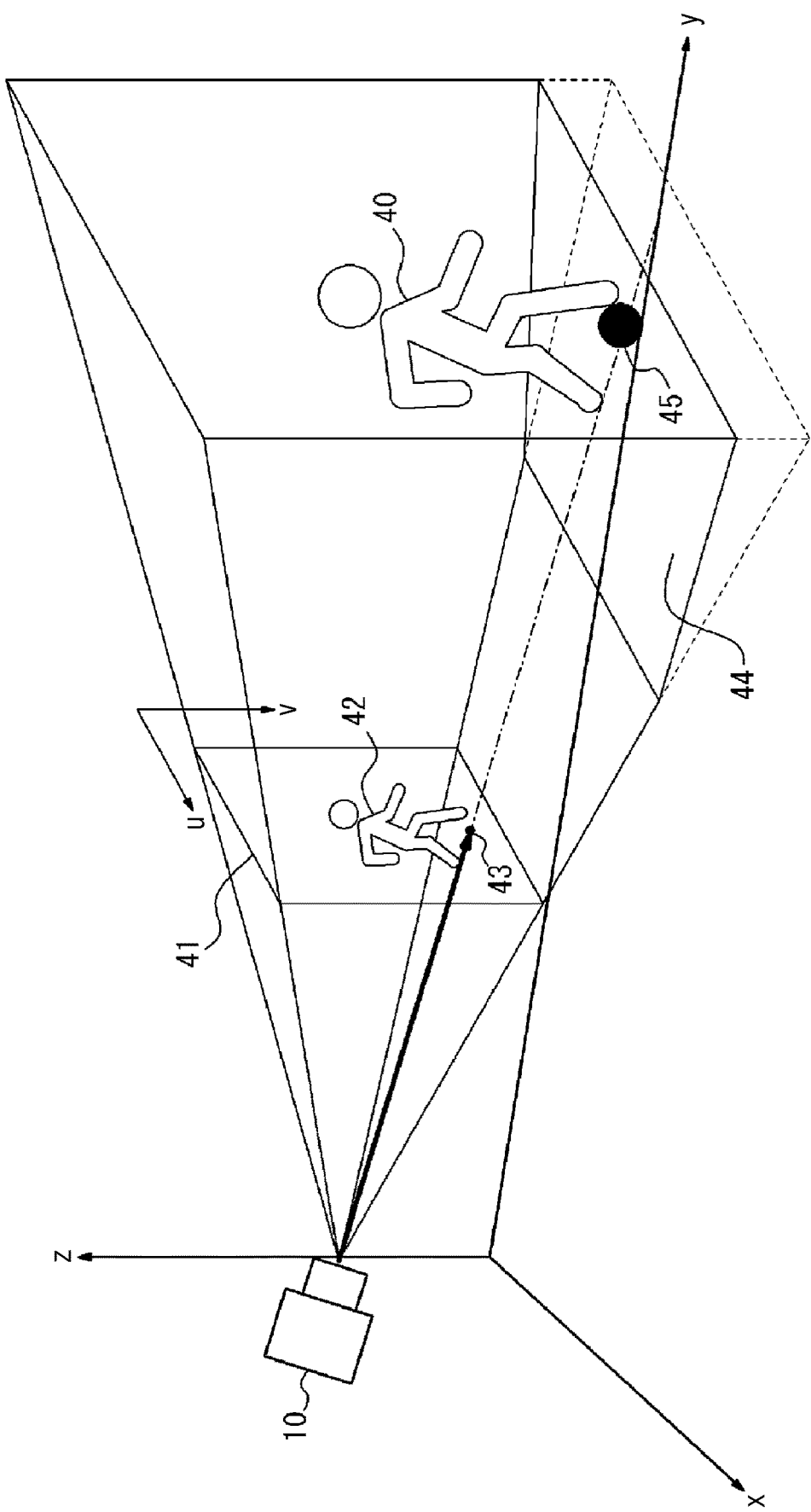
FIG. 5 is a diagram for explaining the relationship between an object in real space, an object image in a video image, and a mass point in virtual space.

The relationship between the object 40 located in the three-dimensional real space and the object image 42 in the two-dimensional image space 41 is illustrated in FIG. 5. If the internal parameters of the imaging device 10 are known, the direction from the center of the imaging optical system 11 of the imaging device 10 to the corresponding coordinates (x, y, z) in the real space can be calculated based on the coordinates (u, v) in the image space 41. The internal parameters of the imaging device 10 include the focal length and distortion of the imaging optical system 11 and the pixel size of the imaging element 12. In the real space, the mass point 45 of the object 40 is taken to be the point where a straight line extending in a direction corresponding to the representative point 43 in the image space 41 intersects a reference plane 44 at z=0. The reference plane 44 corresponds to the road surface or the ground on which the vehicle 100 is located. The mass point 45 has three-dimensional coordinates (x, y, 0). Therefore, when the virtual space 46 is the two-dimensional space at z=0, the coordinates of the mass point 45 can be expressed as (x', y'). The coordinates (x', y') of the mass point 45 in the virtual space 46 correspond to the coordinates (x, y) of a specific point on the object 40 in the xy-plane (z=0) when the object 40 is viewed in a direction along the z axis in the real space. The specific point is a point corresponding to the mass point 45.

Figure 6:
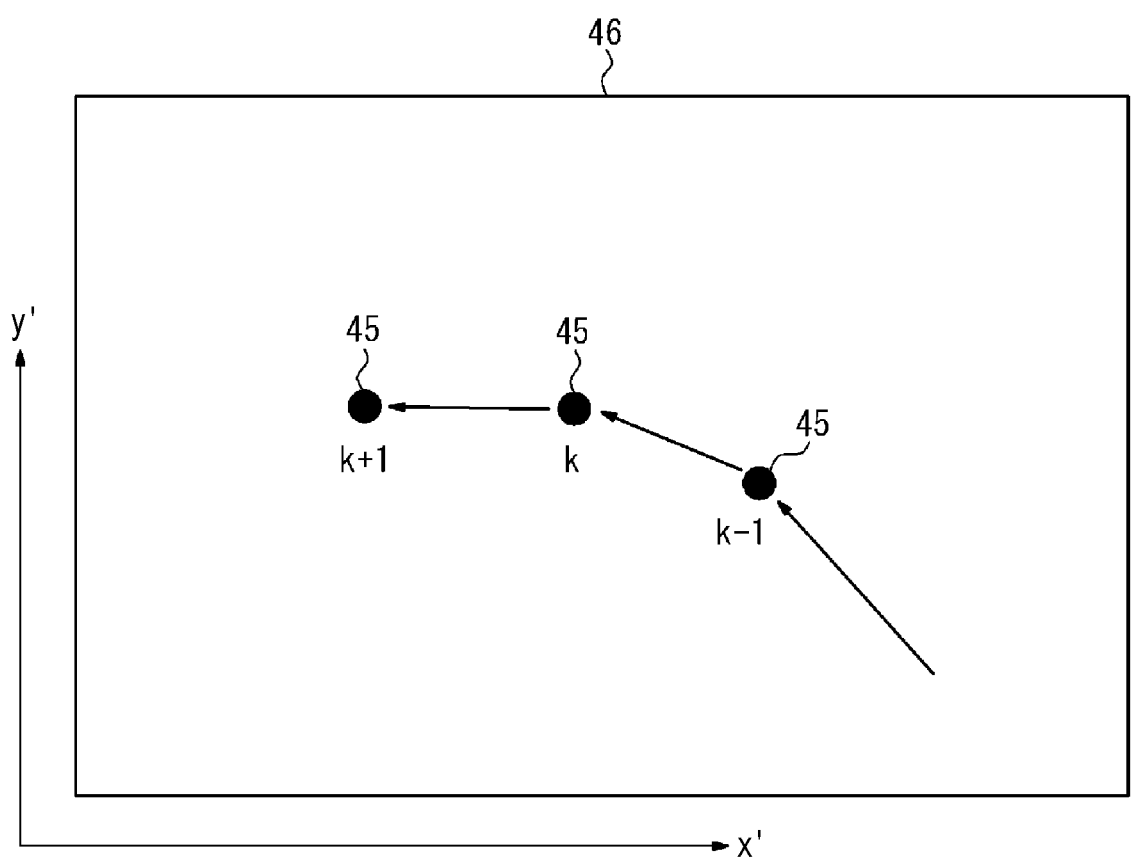
FIG. 6 illustrates an example of the movement of a mass point in virtual space.

The processor 23 tracks, in the virtual space 46, the position (x', y') and velocity ($v_x'$, $v_y'$) of the mass point 45 transformed and mapped from the representative point 43 of the object image 42 to the virtual space 46 (Step S104), as illustrated in FIG. 6. The processor 23 possesses information on the position (x', y') and velocity ($v_x'$, $v_y'$) of the mass point 45, and is therefore able to predict the range of positions (x', y') of the mass point 45 in sequential frames. The processor 23 can recognize the mass point 45, located in a predicted range in the next frame, as being the mass point 45 corresponding to object image 42 that is being tracked. The processor 23 sequentially updates the position (x', y') and velocity ($v_x'$, $v_y'$) of the mass point 45 each time the processor 23 receives input of a new frame.

For example, estimation performed using a Kalman filter based on a state-space model can be used to track the mass point 45. Robustness against not being able to detect and false detection of the object 40 as a detection target is improved by performing prediction/estimation using a Kalman filter. Describing the object image 42 in the image space 41 using an appropriate model for describing motion is generally difficult. Therefore, simple and highly accurate estimation of the position of the object image 42 in the image space 41 was difficult. In the object tracking device 20 of the present disclosure, a model that describes motion in real space can be used by transforming and mapping the object image 42 to the mass point 45 in real space, and therefore the accuracy of tracking of the object image 42 is improved. In addition, treating the object 40 as the mass point 45, which has no size, makes realize easy and simple tracking possible.

The processor 23 may transform and map the coordinates of the mass point 45 in the virtual space 46 to coordinates (u, v) in the image space 41 in order to represent the estimated position each time a new position of the mass point 45 is to be estimated (Step S105). The mass point 45 located at coordinates (x', y') in the virtual space 46 can be transformed and mapped to the image space 41 as a point located at coordinates (x, y, 0) in the real space. The coordinates (x, y, 0) in the real space can be mapped to the coordinates (u, v) in the image space 41 of the imaging device 10 using a known method. The processor 23 can perform conversion between coordinates (u, v) in the image space 41, coordinates (x', y') in the virtual space 46, and coordinates (x, y, 0) in the real space.

In this embodiment, the processor 23 detects multiple detection targets from the video image and performs tracking for each of the detection targets. For example, in the situation illustrated in FIG. 2, the processor 23 performs tracking for each of the pedestrian 40A, the car 40B, and the bicycle 40C. The processor 23 tracks the position and velocity of mass points 45, which respectively represent the multiple detected objects, using the virtual space 46. In order for the processor 23 to carry out the object tracking method illustrated in FIG. 3, a Kalman filter needs to be provided for each of the multiple objects 40. In this embodiment, the processor 23 generates a new Kalman filter upon recognizing a new object image 42 in the video image, and performs tracking once a starting condition is satisfied. In this way, one or more Kalman filters are provided for each of the multiple objects 40 regarded as detection targets. However, if Kalman filters are continually generated for new transient objects 40 (for example, oncoming vehicles that will no longer be contained in the video image after a certain period of time), the number of Kalman filters may increase beyond what is necessary, and this may result in a large computational load and processing delays in tracking of objects. In this embodiment, the processor 23 initializes a Kalman filter when a cancellation condition is satisfied in order ensure that processing delays do not occur.

Figure 7:
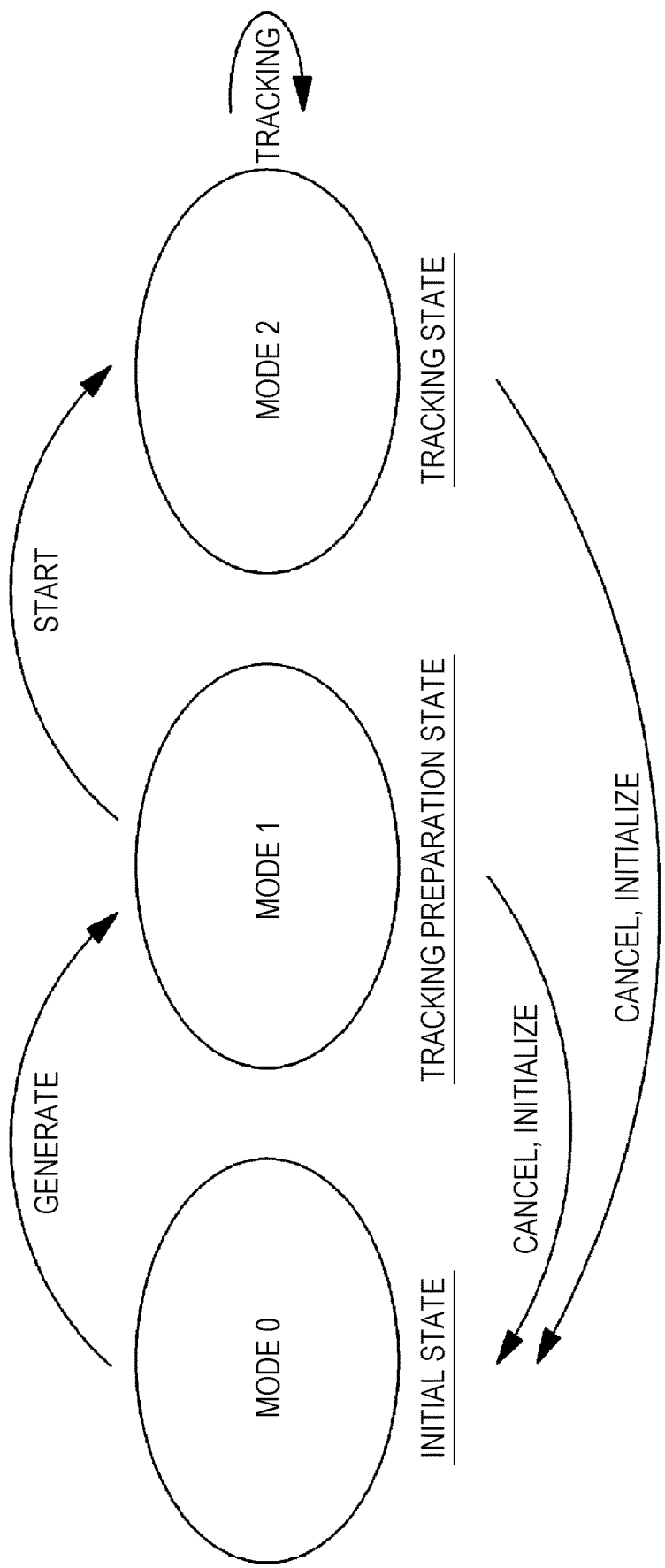
FIG. 7 is diagram for explaining operation modes of a Kalman filter.

FIG. 7 is diagram for explaining operation modes of a Kalman filter. The processor 23 controls each Kalman filter in accordance with an initial state, a tracking preparation state, and a tracking state of a corresponding detection target.

The initial state of a detection target is a state in which a new object image 42, which is a detection target, is recognized in the video image by the processor 23. At this time, the operation mode of the Kalman filter that is associated with the detection target is "mode 0". A Kalman filter in mode 0 has no initial values (position and velocity information). The processor 23 does not track the position of the detection target, i.e., does not predict the range of the position (x', y') of the mass point 45 in the next frame, when the Kalman filter associated with the detection target is in mode 0.

The tracking preparation state is a state in which the object image 42 newly recognized in the previous frame is also recognized in the current frame. In this case, the operation mode of the Kalman filter that is associated with the detection target is "mode 1". When a Kalman filter is in mode 1, the position (x', y') of the mass point 45 of the detection target is acquired, but information on the velocity ($v_x'$, $v_y'$) is not acquired because there is no information on the position of the detection target in the previous frame. In other words, a Kalman filter in mode 1 has only some of the required initial values (position and velocity information). The processor 23 does not track the position of the detection target when the Kalman filter associated with the detection target is in mode 1.

When the Kalman filter is in mode 1, processing for confirming that the object image 42 is not the result of false detection and so on is performed. As illustrated in FIG. 7, when a first cancellation condition is satisfied, i.e., false detection is determined or the object image 42 has disappeared, the operation mode of the Kalman filter is initialized and returns to mode 0. In this way, starting of tracking due to sporadic false detection can be avoided.

As illustrated in FIG. 7, when a starting condition has been satisfied, i.e., the Kalman filter is in mode 1 and the object image 42 that was newly recognized in the previous two frames is also recognized in the current frame, the operation mode of the Kalman filter transitions to mode 2.

The tracking state is a state in which a second cancellation condition has not been satisfied after the above starting condition has been satisfied. The second cancellation condition is the disappearance of the object image 42 in a prescribed number of consecutive frames up to the current frame. In this case, the operation mode of the Kalman filter associated with the detection target is "mode 2". The Kalman filter in mode 2 has the necessary initial values (position and velocity information) and can be immediately used in tracking control. The processor 23 tracks the position of the detection target when the Kalman filter associated with the detection target is in mode 2.

As illustrated in FIG. 7, when the Kalman filter associated with the detection target is in mode 2 and the second cancellation condition is satisfied, the operation mode of the Kalman filter is initialized and returns to mode 0.

Thus, the processor 23 sets the Kalman filter to the tracking state (mode 2) when the same detection target is successively detected. Here, the number of successive detections in this embodiment is 2, but may instead be 3 or more. When the number of successive detections is 3 or more, for example, the mode 1 state (tracking preparation state) may last longer.

The processor 23 also stops the tracking performed using the Kalman filter when the same detection target is not detected in a prescribed number of successive detection operations. Here, the prescribed number is 5 in this embodiment, but is not limited to this number. When tracking an object using a Kalman filter, the range of the position of the detection target can continue to be predicted even without information on the position of the detection object acquired from the video image. However, the error in the predicted range of the position increases as the number of frames for which the information cannot be obtained increases. The above prescribed number may be determined based on the size of this error.

The processor 23 can set the above operation modes for the Kalman filters and dynamically change the settings in order to perform systematic control of multiple Kalman filters on a state-by-state basis.

Figure 8:
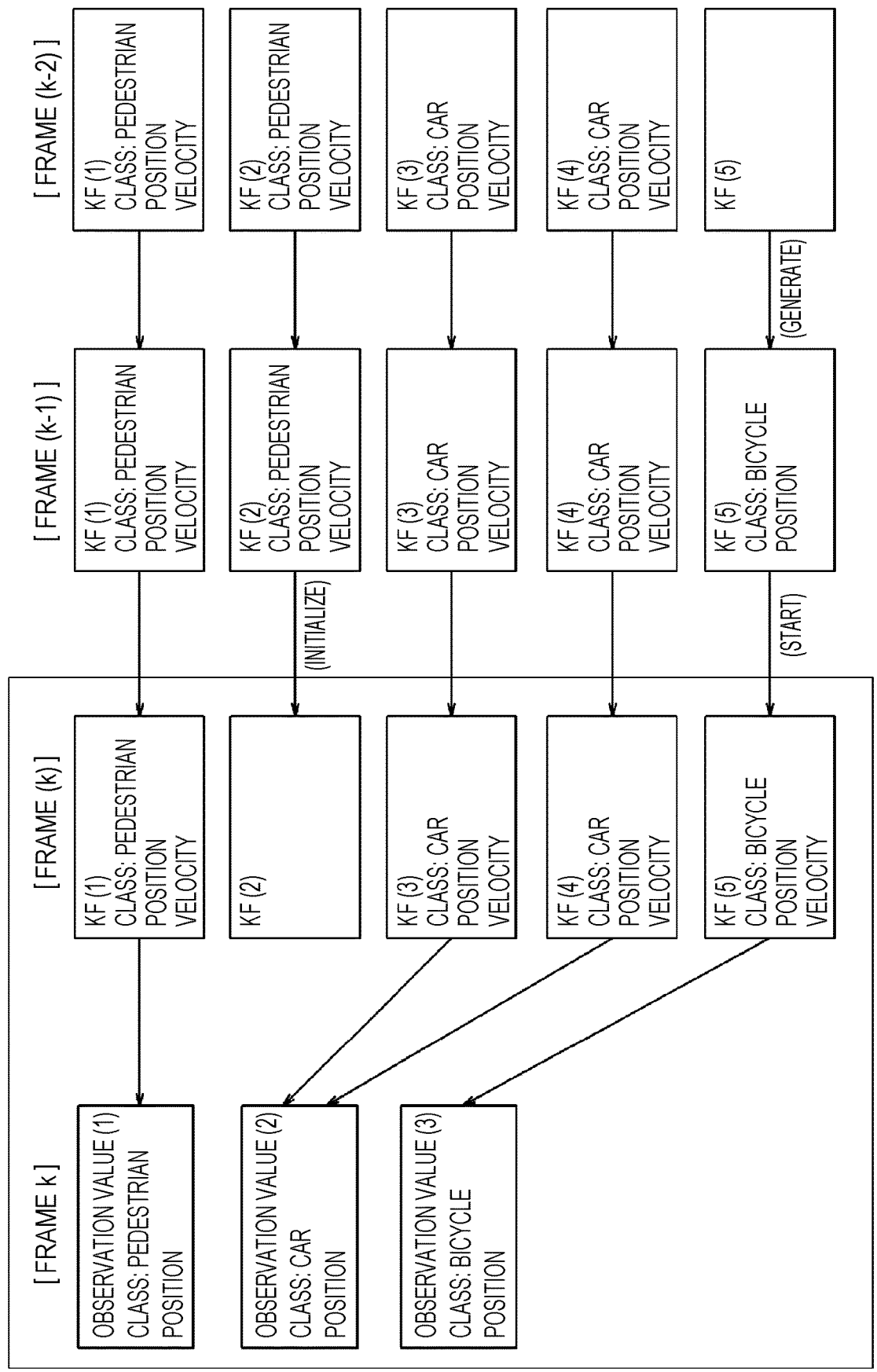
FIG. 8 is a diagram for explaining data association.

FIG. 8 is a diagram for explaining data association. Data association is association between multiple observation values and multiple Kalman filters. Here, an observation value is the position of a detection target. The processor 23 distinguishes between multiple observation values and multiple Kalman filters by attaching identifiers to the observation values and Kalman filters. In this embodiment, the processor 23 respectively labels the multiple observation values as an observation value (1), an observation value (2), an observation value (3), . . . and so on, for example, using serial numbers. The processor 23 also respectively labels the multiple Kalman filters as, for example, KF(1), KF(2), KF(3), . . . and so on using symbols and serial numbers.

In this embodiment, the processor 23 performs data association between M observation values and N Kalman filters. Here, M is an integer greater than or equal to 2. N is an integer greater than or equal to M. In the example in FIG. 8, the processor 23 performs data association with three observation values and five Kalman filters. The observation value (1) is the position of the pedestrian 40A detected in frame (k) of the video image. The observation value (2) is the position of the car 40B detected in frame (k) of the video image. The observation value (3) is the position of the bicycle 40C detected in frame (k) of the video image. Frame (k-1) is the frame one frame before the frame (k) in the video image. Frame (k-2) is the frame two frames before the frame (k) in the video image. The frame (k) is the current frame.

Here, KF(2) was used to track the pedestrian 40A until the time of frame (k-1), after which KF(2) was initialized because the second cancellation condition was satisfied. In other words, the operation mode of KF(2) becomes mode 0 and KF(2) is not used to track the position of the detection target. KF(5) is a Kalman filter newly prepared in response to recognition of a new bicycle 40C in frame (k-2). KF(5) was in mode 1 at frame (k-1), but is now in mode 2 because the starting condition was satisfied. The other Kalman filters have been in mode 2 since frame (k-2) and are continuing to track their respective detection targets.

In the example in FIG. 8, the processor 23 associates KF(1) with the observation value (1). The processor 23 associates KF(3) and KF(4) with the observation value (2). The processor 23 associates KF(5) with the observation value (3). As in the example of the observation value (2), the processor 23 allows overlapping of detection results during the process of tracking multiple detection targets. In other words, the processor 23 uses KF(3) and KF(4) to predict the range of the observation value (2), i.e., the position of the car 40B. In this way, local optimization can be performed by allowing overlapping in data association. For example, methods in which multiple observation values and multiple Kalman filters are associated with each other in a one-to-one manner without allowing overlapping (for example, the Hungarian method) may cause a misassociation resulting from the overall optimization, and the misassocation may possibly result in a chain of misassociations. In this embodiment, since overlapping is allowed, problems such as a chain of misassociations do not occur. In addition, since one or more Kalman filters are associated with each observation value during the tracking process and tracking failures are less likely to occur for any particular observation value, robustness can be improved.

A situation in which multiple Kalman filters are associated with a single observation value could be, for example, a case when a single object is recognized as two objects due to the effect of light reflection or the like, and a new Kalman filter is associated with one of these objects. As described above, control of tracking of detection targets is performed in a parallel manner using multiple associated Kalman filters. However, it may be preferable to output a single detection result having the highest degree of confidence from the output interface 24, for example, when the predicted position of a detection target is to be used to avoid collision of the vehicle 100. The processor 23 may determine the Kalman filter representing the detection result having the highest degree of confidence ("representative Kalman filter") based on the error ellipses of the Kalman filters.

Figure 9:
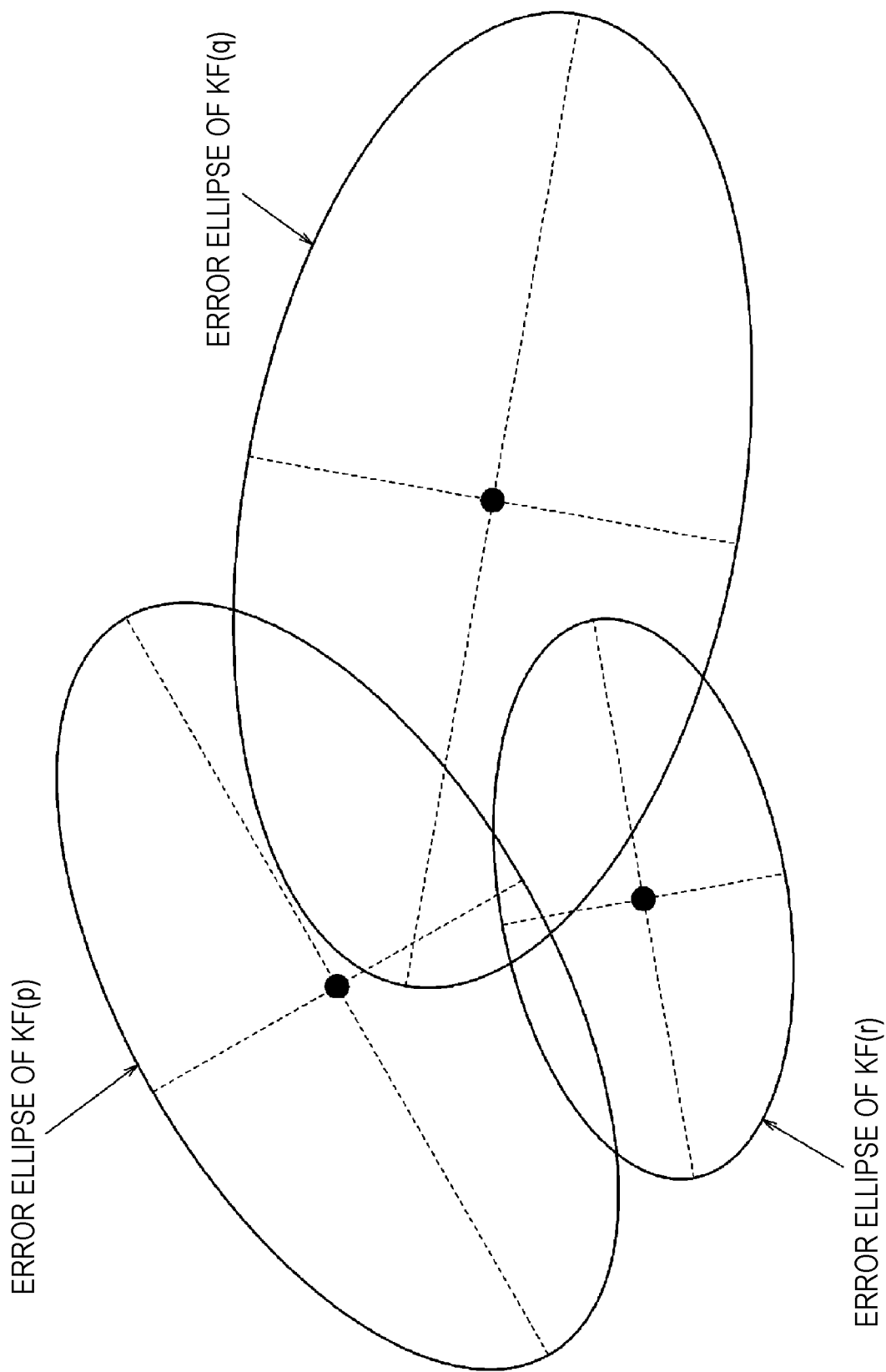
FIG. 9 is a diagram for explaining a representative Kalman filter.

FIG. 9 is a diagram for explaining a representative Kalman filter. In the example in FIG. 9, three Kalman filters KF(p), KF(q), and KF(r), are associated with a single observation value. The processor 23 calculates error ellipses for the three Kalman filters. An error ellipse represents the estimated range of the position based on a probability density distribution, and indicates that the position is located inside the ellipse with a prescribed probability (for example, 99%). An error ellipse is calculated using the standard deviation in the x' direction and the standard deviation in the y' direction and so on. The processor 23 determines the Kalman filter having the smallest error ellipse to be the representative Kalman filter. In the example in FIG. 9, KF(r) is the representative Kalman filter.

In this way, when multiple detected detection targets can be regarding as being the same object, the processor 23 can let the detection target having the smallest estimated range, among estimated ranges based on probability density distributions of the positions of multiple detection targets, be representative of the object. Therefore, the object tracking device 20 is also suitable for driving assistance such as collision avoidance for the vehicle 100.

Multiple Kalman filters can be associated with a single observation value as described above, but multiple observation values can also be associated with a single object, which is a detection target. For example, if the detection target is the car 40B and the car 40B previously disappeared from the video image due to changing lanes and then reappeared in the video image, new observation values may be associated as a different object. In order to accurately track objects, the object tracking device 20 preferably identifies the individual tracked objects and grasps the associations with observation values. In this embodiment, the processor 23 performs hierarchical management, as described below, groups multiple Kalman filters together, and determines whether or not the Kalman filters correspond to the same object.

Figure 10:
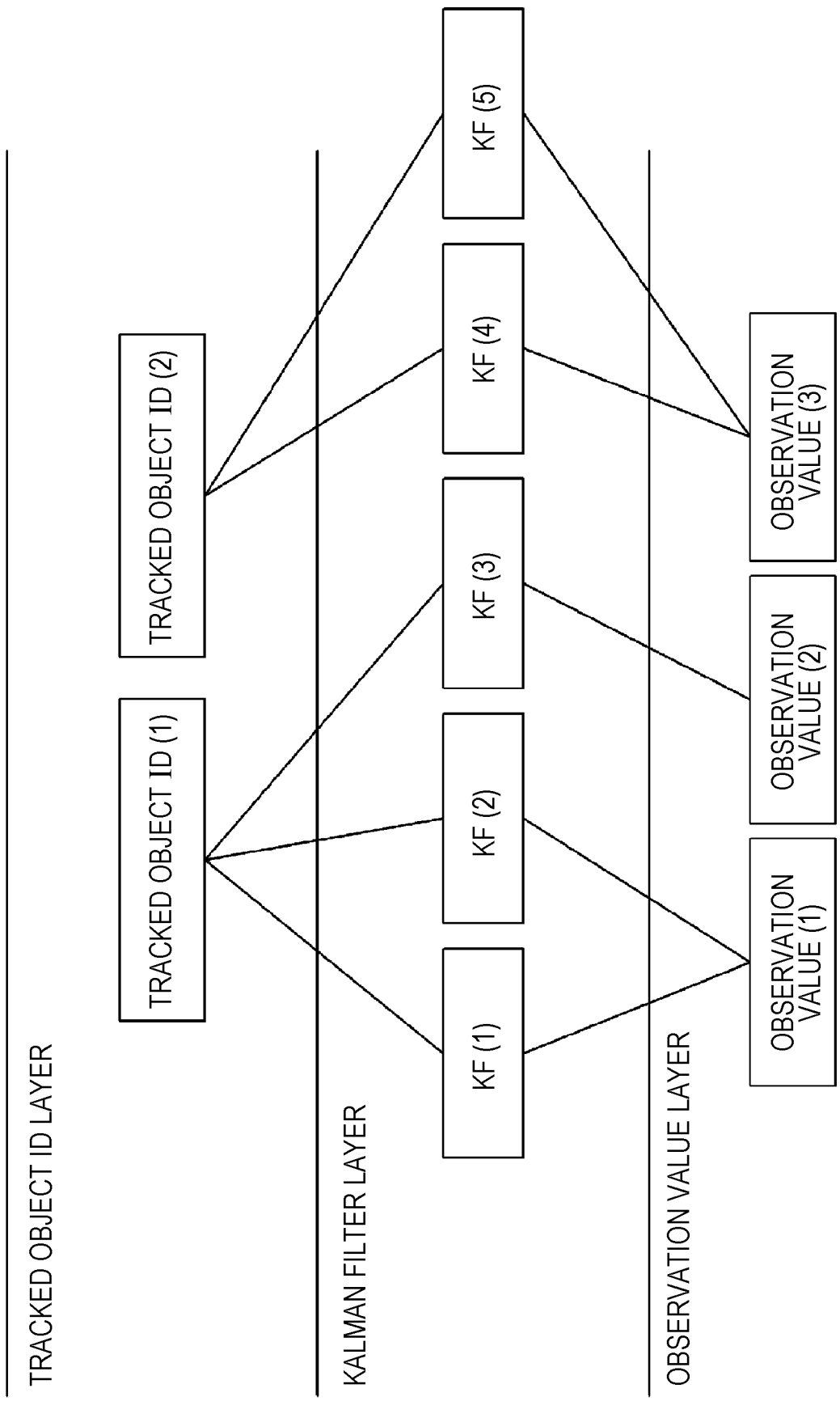
FIG. 10 is a diagram illustrating an example of the layer configuration of tracked object ID management.

FIG. 10 is a diagram illustrating the layer configuration of tracked object ID management in this embodiment. As illustrated in FIG. 10, the processor 23 manages observation values, Kalman filters, and tracked object IDs in respective layers. The processor 23 is able to accurately track objects by associating observation values, Kalman filters, and tracked object IDs with each other. Here, a tracked object ID is unique identification information of a tracked object as described above. If tracked object IDs associated with multiple observation values or multiple Kalman filters are the same, then these observation values or Kalman filters are involved in tracking of the same object.

Figure 11:
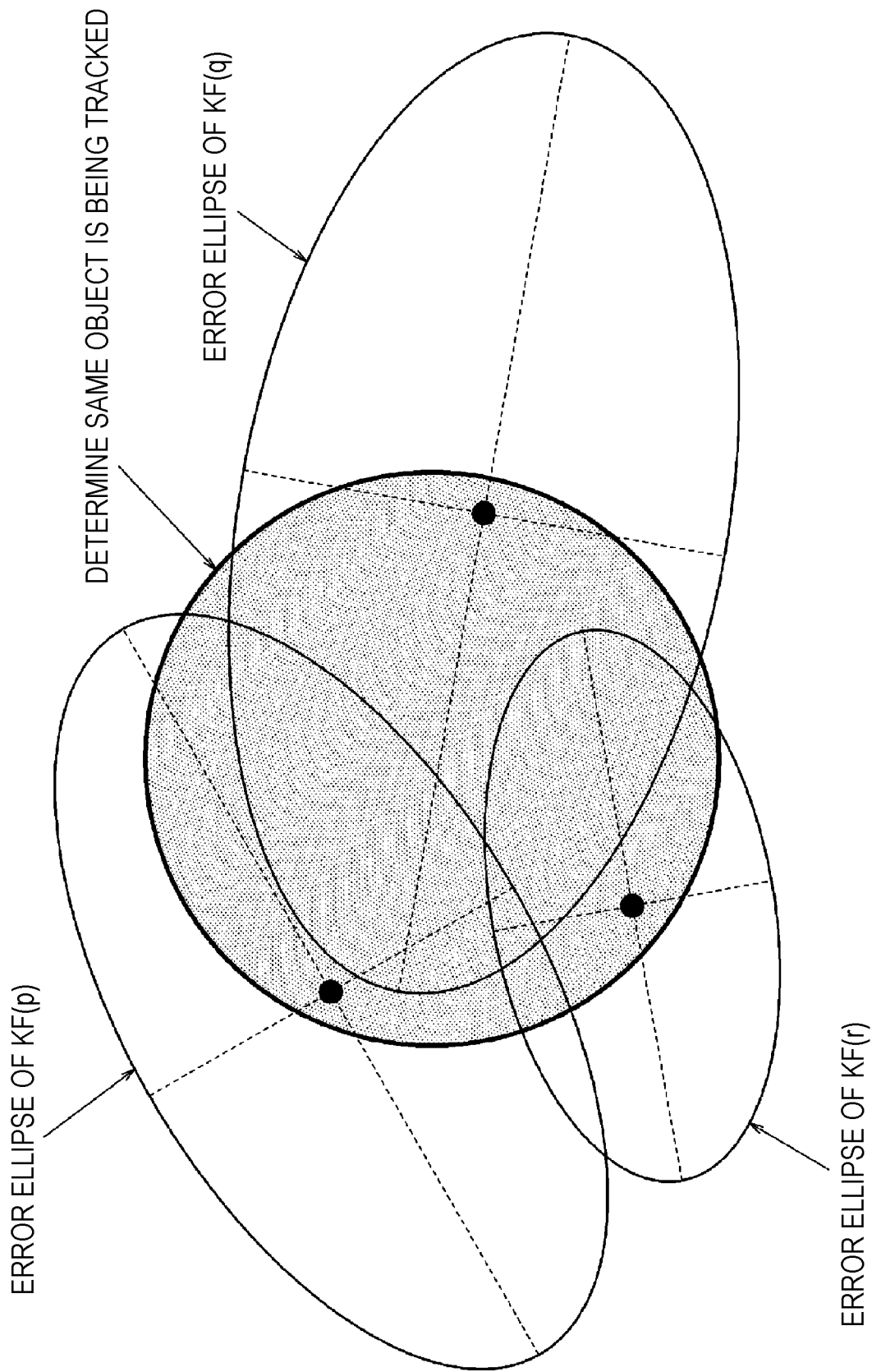
FIG. 11 is a diagram for explaining same object determination.

As described above, the processor 23 generates Kalman filters for new observation values and associates one or more Kalman filters with one observation value. The processor 23 further associates the Kalman filters with tracked object IDs. FIG. 11 is a diagram for explaining same object determination. The processor 23 groups multiple Kalman filters together by performing clustering, for example, density-based spatial clustering of applications with noise (DBSCAN). The processor 23 determines that multiple Kalman filters belong to a single group when the centers of the error ellipses of the Kalman filters lie within a prescribed range. In the example in FIG. 11, the prescribed range is illustrated by a circle. KF(p), KF(q), and KF(r) belong to one group. The prescribed range may vary in accordance with the size of the tracked object. For example, if the tracked object is the car 40B, the prescribed range may be set so as to be larger than if the tracked object were the pedestrian 40A. The prescribed range may be constant regardless of the type of tracked object. The clustering method is not limited to DBSCAN. The clustering may be performed using another method such as the k-means method.

The processor 23 performs grouping of multiple Kalman filters when a frame of a video image is acquired. The processor 23 then updates the associations between the observation values, the Kalman filters, and the tracked objects ID. In the example in FIG. 10, the processor 23 groups KF(1), KF(2), and KF(3) together and assigns an identifier "tracked object ID (1)" to the object being tracked using these Kalman filters in order to perform tracking control for this object. The processor 23 groups KF(4) and KF(5) together and assigns an identifier "tracked object ID (2)" to the object being tracked using these Kalman filters in order to perform tracking control for this object.

Here, KF(1) and KF(2) are associated with observation value (1) and KF(3) is associated with observation value (2). By performing grouping, the processor 23 is able to identify that observation value (1) and observation value (2), which were assumed to be the positions of different objects, are the position of the same object having the tracked object ID (1) as an identifier. The processor 23 controls tracking in a hierarchical structure in which Kalman filters corresponding to objects determined to be the same object are linked together and in which the detection results of detection targets corresponding to these Kalman filters are also linked together, and as a result, error-free and highly accurate tracking is possible. The processor 23 can compare or select detection results obtained using multiple Kalman filters and linked to each other, for example, to obtain detection results having a high degree of confidence. The processor 23 can continue to track the object having the tracked object ID (1) as an identifier using the observation value (1) and KF(1) and KF(2), even if the observation value (2) is lost or KF(3) is initialized, for example. In other words, robustness can be increased.

The processor 23 may determine the Kalman filter having the smallest error ellipse, from among multiple Kalman filters belonging to the same group, to be the representative Kalman filter, similarly to as described above (refer to FIG. 9). In other words, out of the grouped together Kalman filters corresponding to the same object, the processor 23 may determine the Kalman filter having the smallest estimated range based on the probability density distributions of the positions of the multiple detection targets, as being representative of the group.

Figure 12:
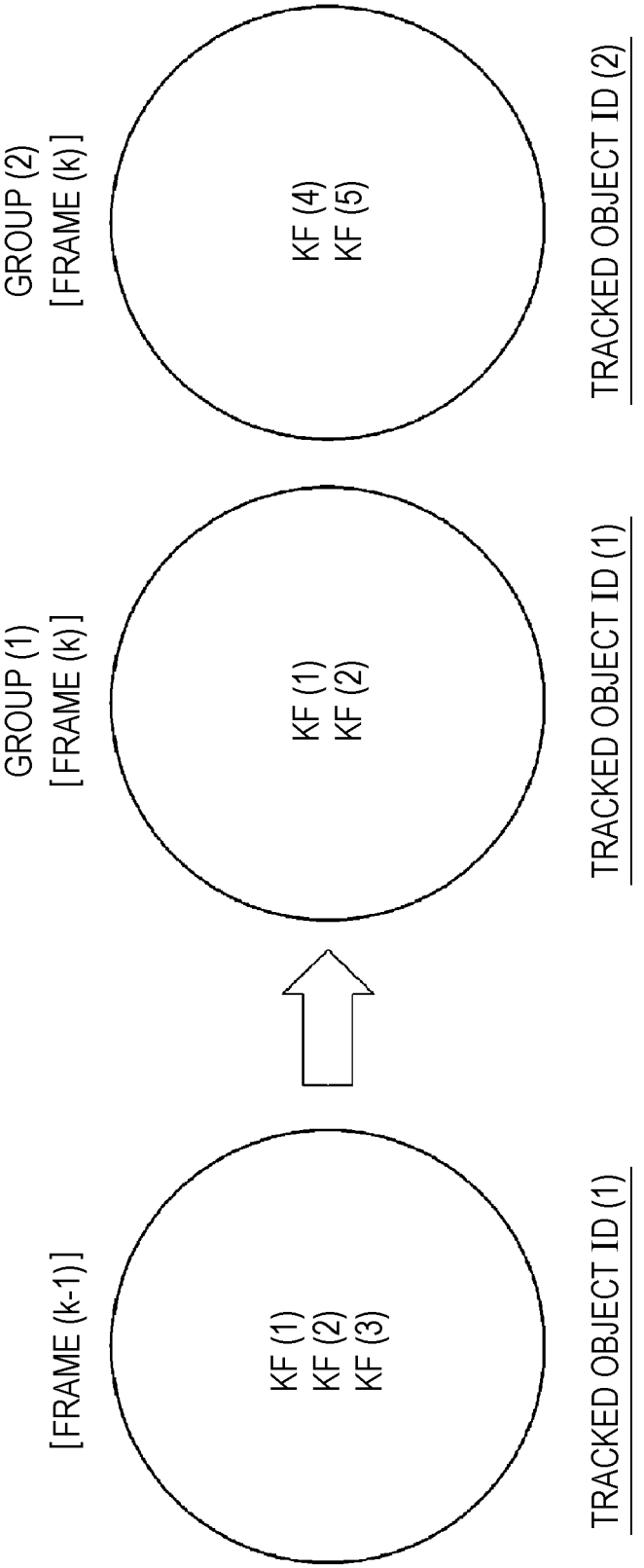
FIG. 12 is a diagram for explaining inheritance of tracked object IDs.

FIG. 12 is a diagram for explaining inheritance of tracked object IDs. As described above, the processor 23 performs grouping of multiple Kalman filters when a frame of a video image is acquired. The processor 23 ensures that tracked object IDs are appropriately inherited based on degrees of similarity when the configuration of a group changes.

In the example in FIG. 12, the processor 23 groups KF(1), KF(2), and KF(3) together and associates these Kalman filters with the tracked object ID (1) when frame (k-1) is acquired. After that, when frame (k) is acquired, the processor 23 similarly groups KF(1) and KF(2) into group (1) and KF(4) and KF(5) into another group (2). Here, KF(3) satisfies the cancellation condition and is excluded from being a target of grouping.

The processor 23 determines the degrees of similarity of group (1) and group (2) with a group existing when frame (k-1) was acquired. Determination of the degrees of similarity is performed by calculating the Simpson coefficient, for example, but is not limited to being calculated using this determination method. As another example, the Jaccard coefficient or the Dice coefficient may be used. The larger the Simpson coefficient, the more similar two groups are. In the example in FIG. 12, group (1) is associated with tracked object ID (1) because group (1), which contains KF(1) and KF(2), has a higher degree of similarity. In other words, group (1) inherits the tracked object ID (1). Another tracked object ID (2) associated with group (2).

For example, suppose that when frame (k+1) is acquired, KF(2) is classified into group (2) instead of group (1). Group (1) containing only KF(1) would have a higher degree of similarity with group (1) at the time when frame (k) was acquired, so the tracked object ID (1) would be inherited as it is.

Thus, the processor 23 manages identifiers based on the similarities of groups at different times. This management allows control of tracking of the same object to be continued in an appropriate manner.

As described above, with the above-described configuration, the object tracking device 20 according to this embodiment groups multiple Kalman filters together in order to determine whether or not each of the Kalman filters corresponds to the same object. Therefore, the object tracking device 20 can track multiple objects with high accuracy without misidentifying the same object as separate objects.

Embodiments of the present disclosure have been described based on the drawings and examples, but it should be noted that a variety of variations and amendments may be easily made by one skilled in the art based on the present disclosure. Therefore, it should be noted that such variations and amendments are included within the scope of the present disclosure. For example, the functions and so forth included in each component or step can be rearranged in a logically consistent manner, and a plurality of components or steps can be combined into a single component or step or a single component or step can be divided into a plurality of components or steps. Although embodiments of the present disclosure have been described with a focus on devices, the embodiments of the present disclosure can also be realized as a method including steps executed by individual component of a device. The embodiments of the present disclosure can also be realized as a method executed by a processor included in a device, a program, or a storage medium recording the program. It is to be understood that the scope of the present disclosure also includes these forms.

In the above embodiments, sensor data obtained by the imaging device 10 detecting the position of a detection target was directly used as an observation value corresponding to the position of the detection target. Here, the object tracking system 1 may be configured to perform detection in parallel with a millimeter wave sensor, a detection device that detects reflected laser light, and so on in addition to the imaging device 10. In this configuration, the object tracking system 1 is able to track multiple objects with even higher accuracy by associating observation values determined to belong to the same detection target. Hereafter, "fusion" refers to associating multiple observation values obtained using physically different sensing methods that are determined to correspond to the same object while taking into account their respective errors. In other words, fusion is a process that allows multiple observation values obtained using different sensing methods to be linked to a single detection target in an overlapping manner. The new observation values generated by using fusion are based on the detection results of multiple sets of sensor data, and consequently this increases the accuracy of the position of the detection target. In addition, since the processor 23 does not reject observation values that have not undergone fusion, complementarity of the observation values is maintained. Fusion-related processing may be performed as data processing (pre-processing) prior to direct object tracking.

Figure 13:
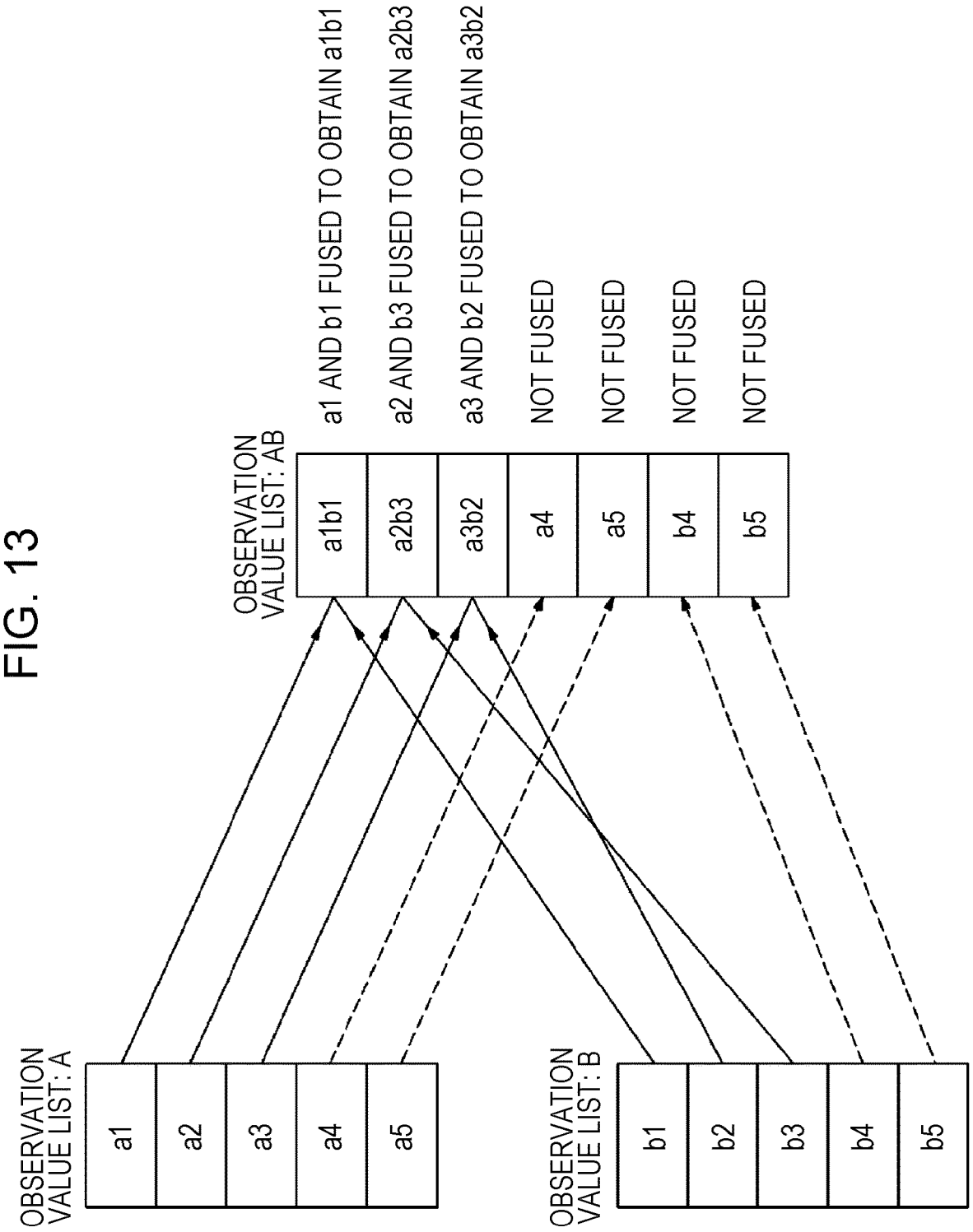
FIG. 13 is a diagram for explaining fusion.

The processor 23 still applies the above-described data association algorithm, which allows overlapping, when updating observation values using fusion. Using the error ellipse of one observation value to be fused as an upper range, the processor 23 selects one observation value having the smallest Mahalanobis distance as the other observation value to be fused. FIG. 13 is a diagram for explaining fusion. In the example in FIG. 13, observation value list A consists of, for example, observation values obtained as detection results of sensor data of the imaging device 10. Observation value list B consists of, for example, observation values obtained as detection results of sensor data of a millimeter-wave sensor. The processor 23 performs fusion in order to merge observation value list A and observation value list B to form observation value list AB. For example, the fusion of a1 from observation list A and b1 from observation list B results in a highly accurate observation value a1b1. The observation values that have not undergone fusion, for example, a4, remain in observation value list AB.

The processor 23 may perform superimposition fusion. Since the errors in fused observation values are always smaller, observation values can be obtained with greater accuracy and precision. FIG. 14 is a diagram for explaining overlapping use of fusion. In the example in FIG. 14, observation value list AB is the same as in FIG. 13. Observation value list C consists of, for example, observation values obtained as detection results of sensor data from a device that detects reflected waves of laser light. The processor 23 merges observation value list A, observation value list B, and observation value list C to form observation value list ABC by performing superimposition fusion. Observation value list ABC contains even more accurate observation values, such as a1b1c1.

Here, fused observation values can be handled in the same way as non-fused observation values. In other words, data association is performed in the same way for both fused observation values and non-fused observation values. Therefore, even when fusion is performed, the algorithm after data association is the same as in the above-described embodiment.

The object tracking system 1 acquires multiple sensor data obtained using different sensing methods, performs processing for fusing observation values as described above (data processing performed as preprocessing in order to perform tracking), and then groups multiple Kalman filters together in order to allow tracking of multiple objects with higher accuracy.

In the above-described embodiment, the object tracking system 1 includes the imaging device 10, the object tracking device 20, and the display 30, but at least two of these components may be implemented in an integrated manner. For example, the functions of the object tracking device 20 can be incorporated into the imaging device 10. In addition to the imaging optical system 11, the imaging element 12, and the processor 13, the imaging device 10 may further include the storage 22 and the output interface 24 described above. The processor 13 may also perform the processing performed by the processor 23 in the above embodiment on video images captured by the imaging device 10. With this configuration, an imaging device 10 that performs object tracking may be realized.

The term "mobile object" in the present disclosure includes vehicles, ships, and aircraft. The term "vehicle" in the present disclosure includes, but is not limited to, automobiles and industrial vehicles, and may also include rail cars and motorhomes as well as fixed-wing aircraft that taxi on runways. Vehicles may include, but are not limited to, passenger cars, trucks, buses, motorcycles, and trolleybuses, and may include other vehicles that travel along roads. Industrial vehicles may include, for example, industrial vehicles used in agriculture and construction. Industrial vehicles may include, but are not limited to, forklift trucks and golf carts. Industrial vehicles used in agriculture may include, but are not limited to, tractors, cultivators, transplanters, binders, combine harvesters, and lawn mowers. Industrial vehicles used in construction may include, but are not limited to, bulldozers, scrapers, excavators, cranes, dump trucks, and road rollers. Vehicles may include human-powered vehicles. The categories of vehicles are not limited to the examples described above. For example, automobiles may include industrial vehicles capable of traveling along roads, and the same vehicles may be included in multiple categories. The term "ships" in the present disclosure includes jet skis, boats, and tankers. The term "aircraft" in the present disclosure includes fixed-wing aircraft and rotary-wing aircraft.

REFERENCE SIGNS 1 object tracking system
10 imaging device
11 imaging optical system
12 imaging element
13 processor
20 object tracking device
21 input interface
22 storage
23 processor
24 output interface
30 display
40 object
40A pedestrian
40B car
40C bicycle
41 image space
42 object image
43 representative point
44 reference plane
45 mass point
46 virtual space
100 vehicle

The invention claimed is:

1. An object tracking device comprising:
a processor configured to:
acquire sensor data;
detect multiple detection targets from the sensor data and perform tracking using at least one Kalman filter of a plurality of Kalman filters for each of the multiple detection targets; and
output detection results of the multiple detection targets,
wherein the processor is configured to group the plurality of Kalman filters into groups, and to determine whether or not each Kalman filter of each group corresponds to an identical detection target of the multiple detection targets.

2. The object tracking device according to claim 1, wherein the processor is configured to perform control in a hierarchical structure in which each Kalman filter that corresponds to the identical detection target is linked and the detection results of the multiple detection targets corresponding to each Kalman filter that corresponds to the identical detection target are linked.

3. The object tracking device according to claim 1, wherein the processor is configured to assign identifiers to the identical detection target and to control tracking of the identical detection target.

4. The object tracking device according to claim 3, wherein the processor is configured to manage the identifiers in accordance with a degree of similarity of each respective group that includes a Kalman filter that corresponds to the identical detection target at different times.

5. The object tracking device according to claim 1, wherein for each group that includes a Kalman filter that corresponds to the identical detection target, the processor is configured to make a Kalman filter of the group having a smallest estimated range, among estimated ranges based on probability density distributions of positions of the multiple detection targets, be representative of the group.

6. The object tracking device according to claim 1, wherein the processor is configured to allow overlapping of the detection results during a process of tracking the multiple detection targets.

7. The object tracking device according to claim 1, wherein the processor is configured to track positions and velocities of mass points respectively representing the multiple detection targets using a virtual space, the virtual space being a two-dimensional space having a prescribed fixed value in a z-axis direction in a coordinate system consisting of three real space axes that are an x axis, a y axis, and a z axis.

8. An object tracking method comprising:
acquiring sensor data;
detecting multiple detection targets from the sensor data and tracking each detection target of the multiple detection targets using a Kalman filter of a plurality of Kalman filters; and
outputting detection results of the multiple detection targets,
wherein the tracking includes grouping the plurality of Kalman filters and determining whether or not each Kalman filter of each group corresponds to an identical detection target of the multiple detection targets.

9. An object tracking device comprising:
a processor configured to:
acquire multiple sensor data obtained using different sensing methods; and
detect multiple detection targets from the multiple sensor data and to perform data processing for tracking each detection target of the multiple detection targets using a Kalman filter of a plurality of Kalman filters,
wherein the processor is configured to group the plurality of Kalman filters and to determine whether or not each Kalman filter of each group corresponds to an identical detection target of the multiple detection targets.

10. An object tracking method comprising:
acquiring multiple sensor data obtained using different sensing methods; and
detecting multiple detection targets from the multiple sensor data and performing data processing for tracking each detection target of the multiple detection targets using a Kalman filter of a plurality of Kalman filters,
wherein the tracking includes grouping the plurality of Kalman filters and determining whether or not each Kalman filter of each group corresponds to an identical detection target of the multiple detection targets.

* * * * *